(12) United States Patent
Seo et al.

(10) Patent No.: US 12,322,830 B2
(45) Date of Patent: Jun. 3, 2025

(54) SEPARATOR FOR LITHIUM SECONDARY BATTERY AND LITHIUM SECONDARY BATTERY COMPRISING SAME

(71) Applicant: Samsung SDI Co., Ltd., Yongin-si (KR)

(72) Inventors: Dongwan Seo, Yongin-si (KR); Gain Kim, Yongin-si (KR); Yangseob Kim, Yongin-si (KR); Yongkyoung Kim, Yongin-si (KR); Jungyoon Lee, Yongin-si (KR); Yeonjoo Choi, Yongin-si (KR); Hyeonsun Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 374 days.

(21) Appl. No.: 17/296,528

(22) PCT Filed: Jul. 24, 2019

(86) PCT No.: PCT/KR2019/009136
§ 371 (c)(1),
(2) Date: May 24, 2021

(87) PCT Pub. No.: WO2020/138620
PCT Pub. Date: Jul. 2, 2020

(65) Prior Publication Data
US 2022/0021076 A1    Jan. 20, 2022

(30) Foreign Application Priority Data

Dec. 26, 2018 (KR) .................. 10-2018-0169182

(51) Int. Cl.
*H01M 50/446* (2021.01)
*H01M 10/0525* (2010.01)
(Continued)

(52) U.S. Cl.
CPC ..... *H01M 50/446* (2021.01); *H01M 10/0525* (2013.01); *H01M 50/443* (2021.01); *H01M 50/449* (2021.01); *H01M 50/489* (2021.01)

(58) Field of Classification Search
CPC ........... H01M 50/446; H01M 10/0525; H01M 50/443; H01M 50/449; H01M 50/489;
(Continued)

(56) References Cited

U.S. PATENT DOCUMENTS

2006/0263693 A1    11/2006  Kim et al.
2010/0112454 A1     5/2010  Visco
(Continued)

FOREIGN PATENT DOCUMENTS

CA    2881701 A1    3/2014
CN    1855584 A    11/2006
(Continued)

OTHER PUBLICATIONS

"derive." New Oxford American Dictionary. Eds. Stevenson, Angus, and Christine A. Lindberg. : Oxford University Press, 2011. Oxford Reference. Date Accessed Aug. 10, 2023, https://www.oxfordreference.com/view/10.1093/acref/9780195392883.001.0001/m_en_us1239627. (Year: 2011).

(Continued)

*Primary Examiner* — Helen Oi K Conley
(74) *Attorney, Agent, or Firm* — Womble Bond Dickinson (US) LLP

(57) ABSTRACT

The present invention relates to a separator for a lithium secondary battery and a lithium secondary battery including same, the separator including: a porous substrate; and a coating layer on at least one surface of the porous substrate. The coating layer includes a (meth)acrylic copolymer including a first structural unit derived from (meth)acrylamide, a second structural unit derived from (meth)acryloni- (Continued)

trile, and a third structural unit derived from (meth)acrylamido sulfonic acid, (meth)acrylamido sulfonic acid salt, or a combination thereof. The first structural unit is included in an amount of 55 mol % to 90 mol % based on 100 mol % of the (meth)acrylic copolymer and the second structural unit and third structural unit are each independently included in 5 mol % to 40 mol % based on 100 mol % of the (meth)acrylic copolymer. The (meth)acrylic copolymer has a weight average molecular weight of 200,000 to 700,000.

10 Claims, 1 Drawing Sheet

(51) Int. Cl.
 H01M 50/443 (2021.01)
 H01M 50/449 (2021.01)
 H01M 50/489 (2021.01)
(58) Field of Classification Search
 CPC .. H01M 50/42; H01M 50/434; H01M 50/411; H01M 10/052; H01M 50/431; H01M 50/46; H01M 50/463; H01M 50/491; Y02E 60/10
 See application file for complete search history.

(56) References Cited

U.S. PATENT DOCUMENTS

| | | |
|---|---|---|
| 2010/0233409 A1 | 9/2010 | Kamiya et al. |
| 2011/0318630 A1 | 12/2011 | Wakizaka et al. |
| 2012/0115036 A1 | 5/2012 | Lee et al. |
| 2013/0017429 A1 | 1/2013 | Ha et al. |
| 2013/0252066 A1 | 9/2013 | Yeou et al. |
| 2013/0302661 A1 | 11/2013 | Kim et al. |
| 2013/0323569 A1 | 12/2013 | Yeou et al. |
| 2013/0330590 A1 | 12/2013 | Toyoda |
| 2014/0050965 A1 | 2/2014 | Ha et al. |
| 2014/0120402 A1 | 5/2014 | Yu et al. |
| 2014/0342226 A1 | 5/2014 | Toyoda |
| 2014/0186680 A1 | 7/2014 | Kim et al. |
| 2014/0272532 A1 | 9/2014 | Park et al. |
| 2014/0147726 A1 | 11/2014 | Sasaki |
| 2015/0010815 A1 | 1/2015 | Chung et al. |
| 2015/0030933 A1 | 1/2015 | Goetzen et al. |
| 2015/0111086 A1 | 4/2015 | Arnold et al. |
| 2015/0333308 A1 | 11/2015 | Toyoda et al. |
| 2016/0013465 A1 | 1/2016 | Akiike |
| 2016/0141581 A1 | 5/2016 | Sasaki et al. |
| 2016/0149184 A1 | 5/2016 | Nam et al. |
| 2016/0149190 A1 | 5/2016 | Fukuchi |
| 2016/0181618 A1 | 6/2016 | Hoshiba |
| 2016/0344007 A1 | 11/2016 | Toyoda et al. |
| 2017/0162848 A1 | 6/2017 | Pan et al. |
| 2017/0200932 A1 | 7/2017 | Sasaki et al. |
| 2017/0326863 A1 | 11/2017 | Wang et al. |
| 2017/0338461 A1 | 11/2017 | Seo et al. |
| 2018/0053963 A1 | 2/2018 | Tanaka |
| 2018/0114966 A1 | 4/2018 | Yasuda et al. |
| 2018/0337381 A1 | 11/2018 | Seo et al. |
| 2018/0351149 A1 | 12/2018 | Aklike et al. |
| 2018/0358649 A1 | 12/2018 | Inoue et al. |
| 2019/0013504 A1 | 1/2019 | Choi et al. |
| 2019/0106521 A1 | 4/2019 | Takamatsu |
| 2019/0245183 A1 | 8/2019 | Jeong et al. |
| 2019/0288293 A1 | 9/2019 | Arihara |
| 2020/0388808 A1 | 12/2020 | Choi et al. |
| 2021/0226299 A1 | 7/2021 | Choi et al. |
| 2021/0234235 A1 | 7/2021 | Kang et al. |
| 2022/0013859 A1 | 1/2022 | Kim et al. |
| 2022/0029244 A1 | 1/2022 | Kim et al. |
| 2022/0037739 A1 | 2/2022 | Lee et al. |
| 2022/0037741 A1 | 2/2022 | Lee et al. |
| 2022/0102810 A1 | 3/2022 | Kim et al. |

FOREIGN PATENT DOCUMENTS

| | | | |
|---|---|---|---|
| CN | 102770984 A | 11/2012 | |
| CN | 102893427 A | 1/2013 | |
| CN | 103390740 A | 11/2013 | |
| CN | 103620820 A | 3/2014 | |
| CN | 103718336 A | 4/2014 | |
| CN | 103857732 A | 6/2014 | |
| CN | 104277746 A | 1/2015 | |
| CN | 104521031 A | 4/2015 | |
| CN | 105324868 A | 2/2016 | |
| CN | 105378989 A | 3/2016 | |
| CN | 105440770 A | 3/2016 | |
| CN | 105531854 A | 4/2016 | |
| CN | 106328865 A | 1/2017 | |
| CN | 107394087 A | 11/2017 | |
| CN | 107851765 A | 3/2018 | |
| CN | 108305970 A | 7/2018 | |
| CN | 108463904 A | 8/2018 | |
| CN | 108666499 A | 10/2018 | |
| CN | 108963148 A | 12/2018 | |
| CN | 109037564 A | 12/2018 | |
| CN | 109075291 A | 12/2018 | |
| CN | 113228397 A | 8/2021 | |
| EP | 2549564 A2 | 1/2013 | |
| EP | 2779277 A1 | 9/2014 | |
| EP | 3246969 A1 | 11/2017 | |
| EP | 3588636 A1 | 1/2020 | |
| EP | 3748730 A1 | 12/2020 | |
| EP | 3855529 A1 | 7/2021 | |
| EP | 3902027 A1 | 10/2021 | |
| EP | 3902028 A1 | 10/2021 | |
| EP | 3905381 A | 11/2021 | |
| EP | 3907781 A1 | 11/2021 | |
| JP | 03-175023 A | 7/1991 | |
| JP | 2011-832 A | 1/2011 | |
| JP | 2011-5670 A | 1/2011 | |
| JP | 2014-149935 A | 8/2014 | |
| JP | 2014-225410 A | 12/2014 | |
| JP | 2014-229406 A | 12/2014 | |
| JP | WO2015046191 * | 4/2015 | ............. H01M 4/13 |
| JP | 2015-88253 A | 5/2015 | |
| JP | 2015-088253 A | 5/2015 | |
| JP | 2015-185530 A | 10/2015 | |
| JP | 2016-105398 A | 6/2016 | |
| JP | 2017-050149 A | 3/2017 | |
| JP | 2017-103206 A | 6/2017 | |
| JP | 2018-26266 A | 2/2018 | |
| JP | 2018-34496 A | 3/2018 | |
| JP | 2018-092701 A | 6/2018 | |
| JP | 2019-57486 A | 4/2019 | |
| JP | 2020087591 * | 6/2020 | ............. H01M 2/16 |
| KR | 10-2011-0097715 A | 8/2011 | |
| KR | 10-2011-0104791 A | 9/2011 | |
| KR | 10-2012-0093772 A | 8/2012 | |
| KR | 10-2012-0097238 A | 9/2012 | |
| KR | 10-1254693 B1 | 4/2013 | |
| KR | 10-2014-0044757 A | 4/2014 | |
| KR | 10-2014-0116415 A | 10/2014 | |
| KR | 10-2014-0147742 A | 12/2014 | |
| KR | 10-2015-0034825 A | 4/2015 | |
| KR | 10-2016-0033692 A | 3/2016 | |
| KR | 10-2016-0061165 A | 5/2016 | |
| KR | 10-2016-0109669 A | 9/2016 | |
| KR | 10-2016-0118979 A | 10/2016 | |
| KR | 10-2017-0003020 A | 1/2017 | |
| KR | 10-2017-0015149 A | 2/2017 | |
| KR | 10-2017-0045438 A | 4/2017 | |
| KR | 10-2017-0084597 A | 7/2017 | |
| KR | 10-2017-0095024 A | 8/2017 | |
| KR | 10-2017-0129645 A | 11/2017 | |
| KR | 10-2018-0003177 A | 1/2018 | |
| KR | 10-1868240 B1 | 6/2018 | |
| KR | 10-2018-0109740 A | 10/2018 | |
| WO | WO 2009/060787 A1 | 5/2009 | |
| WO | WO 2010/074205 A1 | 7/2010 | |
| WO | WO 2013/080938 A1 | 6/2013 | |
| WO | WO 2014/054919 A1 | 4/2014 | |
| WO | WO 2014/136799 A1 | 9/2014 | |

(56) References Cited

FOREIGN PATENT DOCUMENTS

| WO | WO 2015/008626 A1 | 1/2015 |
|---|---|---|
| WO | WO 2015/076571 A1 | 5/2015 |
| WO | WO 2015/122322 A1 | 8/2015 |
| WO | WO 2018/147714 A1 | 8/2018 |
| WO | WO 2018/155345 A1 | 8/2018 |

OTHER PUBLICATIONS

Chinese Decision of Rejection, with English translation, dated Jul. 1, 2023, issued in Chinese Patent Application No. 201980085911.X (21 pages).
Chinese Notice of Allowance, with English translation, dated Jan. 13, 2023, issued in Chinese Patent Application No. 201980055198.4 (8 pages).
Chinese Office Action, with English translation, dated Apr. 13, 2023, issued in corresponding Chinese Patent Application No. 201980083245.6 (6 pages).
Chinese Office Action, with English translation, dated Apr. 23, 2023, issued in Chinese Patent Application No. 201980085835.2 (15 pages).
Chinese Office Action, with English translation, dated Aug. 12, 2023, issued in Chinese Patent Application No. 201980082244.X (13 pages).
Chinese Office Action, with English translation, dated Aug. 3, 2022, issued in Chinese Patent Application No. 201980055198.4 (20 pages).
Chinese Office Action, with English translation, dated Jun. 22, 2023, issued in Chinese Patent Application No. 201980087908.1 (23 pages).
Chinese Office Action, with English translation, dated Oct. 24, 2022, issued in Chinese Patent Application No. 201980087908.1 (18 pages).
Chinese Office Action, with English translation, dated Sep. 20, 2022, issued in corresponding Chinese Patent Application No. 201980083245.6 (28 pages).
Chinese Office Action, with English translation, dated Sep. 30, 2022, issued in Chinese Patent Application No. 201980085835.2 (15 pages).
EPO Extended European Search Report dated Aug. 3, 2022, issued in corresponding European Patent Application No. 19898125.0 (11 pages).
EPO Extended European Search Report dated Dec. 6, 2022, issued in European Patent Application No. 19910153.6 (9 pages).
EPO Extended European Search Report dated May 17, 2022, issued in European Patent Application No. 19861770.6 (10 pages).
EPO Extended European Search Report dated Oct. 14, 2022, issued in European Patent Application No. 19904249.0 (9 pages).
EPO Third Party Observations dated Sep. 21, 2021, issued in European Patent Application No. 19861770.6 (20 pages).
Ghosh, Prof. Premamoy, "Polymer Science Fundamentals of Polymer Science: Molecular Weights of Polymers," Sep. 2006, XP055608363, 22 pages.
International Search Report for Application No. PCT/KR2019/008767 dated Oct. 25, 2019, 4pp.
International Search Report for Application No. PCT/KR2019/009085 dated Oct. 30, 2019, 4pp.
International Search Report for Application No. PCT/KR2019/010130 dated Nov. 26, 2019, 4pp.
International Search Report for corresponding Application No. PCT/KR2019/010128 dated Nov. 26, 2019, 6pp.
Japanese Office Action dated Jun. 20, 2022, issued in Japanese Patent Application No. 2021-513921 (6 pages).
Notification of Third Party Observation dated Jun. 6, 2022, 15 pages.
U.S. Final Office Action dated Aug. 18, 2023, issued in U.S. Appl. No. 17/414,043 (19 pages).
U.S. Final Office Action dated Sep. 25, 2023, issued in U.S. Appl. No. 17/296,501 (26 pages).
U.S. Office Action dated Jun. 14, 2023, issued in U.S. Appl. No. 17/296,501 (29 pages).
U.S. Office Action dated May 2, 2023, issued in U.S. Appl. No. 17/414,043, 19 pages, citing the references listed above.
International Search Report for corresponding Application No. PCT/KR2019/009136 dated Oct. 30, 2019, 4pp.
Limparyoon, Nattawut, et al., "Acrylamide/2-acrylamido-2-methylpropane sulfonic acid and associated sodium salt superabsorbent copolymer nanocomposites with mica as fire retardants", Polymer Degradation and Stability, vol. 96, No. 6, pp. 1054-1063, 2011.
Chinese Office Action for CN Application No. 201980082244.X dated Sep. 26, 2022, 14 pages.
Chinese Office Action for CN Application No. 201980084182.6 dated Sep. 29, 2022, 16 pages.
Chinese Office Action for CN Application No. 201980085911.X dated Oct. 8, 2022, 21 pages.
Chinese Office Action for CN Application No. 201980087928.9 dated Oct. 9, 2022, 21 pages.
European Search Report for EP 19906911.3 dated Oct. 14, 2022, 7 pages.
Fedelich, "Application Handbook Thermal Analysis of Polymers Selected Applications Thermal Analysis", Jan. 1, 2013, XP055608279, Retrieved from the Internet: URL: https://www.mt.com/dam/LabDiv/guides-glen/ta-polymer/TA_Polymers_Selected_Apps_EN.pdf [retrieved on Jul. 24, 2019], 40 pgs.
Ghosh, "Polymer Science Fundamentals of Polymer Science Molecular Weights of Polymers CONTENTS Introduction Concept of Average Molecular Weight No. Average Molecular Weight Membrane Osmometry Weight Average Molecular Weight Assessment of Shape of Polymer Molecules Viscosity Average Molecular Weight Gener", Sep. 21, 2006, XP055608363, 22 pgs.
International Search Report for corresponding Application No. PCT/KR2019/009945 dated Nov. 20, 2019, 4pp.
International Search Report for corresponding Application No. PCT/KR2019/010129 dated Nov. 28, 2019, 4pp.
Chang, Song, et al., "A review of functional separator for improving the flammability of lithium-sulfur batteries," The Chinese Journal of Process Engineering, vol. 18 S1, Nov. 2018, 10 pages.
Li, Xia, et al., "Derivatives of Acrylamide and Their Application," Fine and Specialty Chemicals, vol. 13, No. 24, Dec. 2005, 5 pages.
Liu, Meihua, et al., "Enhancement on the thermostability and wettability of lithium-ion batteries separator via surface chemical modification," Materials Letters, vol. 208, 2017, pp. 98-101.
Chinese Notice of Allowance, with English translation, dated Aug. 30, 2023, issued in Chinese Patent Application No. 201980084182.6 (8 pages).
Technical Data Sheet of Boeh mite 200SM by Nalbatec AG, retrieved from https://nabaltec.de/en/products/boehmite/ (Year: 2023).
Technical Data Sheet of Boeh mite AOH 60 by Nalbatec AG, retrieved from https://nabaltec.de/en/products/boehmite/ (Year: 2023).
U.S. Office Action dated Dec. 1, 2023, issued in U.S. Appl. No. 17/297,373 (pages).
Chinese Office Action, with English translation, dated Mar. 8, 2023, issued in Chinese Patent Application No. 201980085911.X (20 pages).
Chinese Office Action, with English translation, dated Apr. 3, 2023, issued in Chinese Patent Application No. 201980087928.9 (28 pages).
Chinese Office Action, with English translation, dated Apr. 20, 2023, issued in corresponding Chinese Patent Application No. CN 201980082244.X (13 pages).
EPO Extended European Search Report dated Dec. 20, 2022, issued in corresponding European Patent Application No. 19902175.9 (8 pages).
International Search Report for Application No. PCT/KR2019/010131 dated Nov. 28, 2019, 4 pp.
Chinese Office Action for CN Appl. 201980084182.6 dated May 31, 2023, 19 pgs.
European Search Report for EP 19898811.5 dated Aug. 3, 2022, 11 pages.
European Search Report for EP 19902841.6 dated Aug. 12, 2022, 12 pages.

(56) References Cited

OTHER PUBLICATIONS

U.S. Office Action dated Sep. 10, 2024, issued in U.S. Appl. No. 17/294,343 (18 pages).
U.S. Office Action dated Jun. 20, 2024, issued in U.S. Appl. No. 17/416,686 (19 pages).
EPO Office Action dated Nov. 28, 2024, issued in European Patent Application No. 19898811.5 (4 pages).
U.S. Office Action dated Feb. 7, 2024, issued in U.S. Appl. No. 17/294,343 (20 pages).
CA 2881701 A1 provided with US Office Action dated Feb. 7, 2024, issued in U.S. Appl. No. 17/294,343.
U.S. Final Office Action dated Mar. 6, 2024, issued in U.S. Appl. No. 17/297,373 (9 pages).
U.S. Final Office Action dated Jan. 13, 2025, issued in U.S. Appl. No. 17/416,686 (22 pages).
U.S. Final Office Action dated May 22, 2024, issued in U.S. Appl. No. 17/294,343 (22 pages).

* cited by examiner

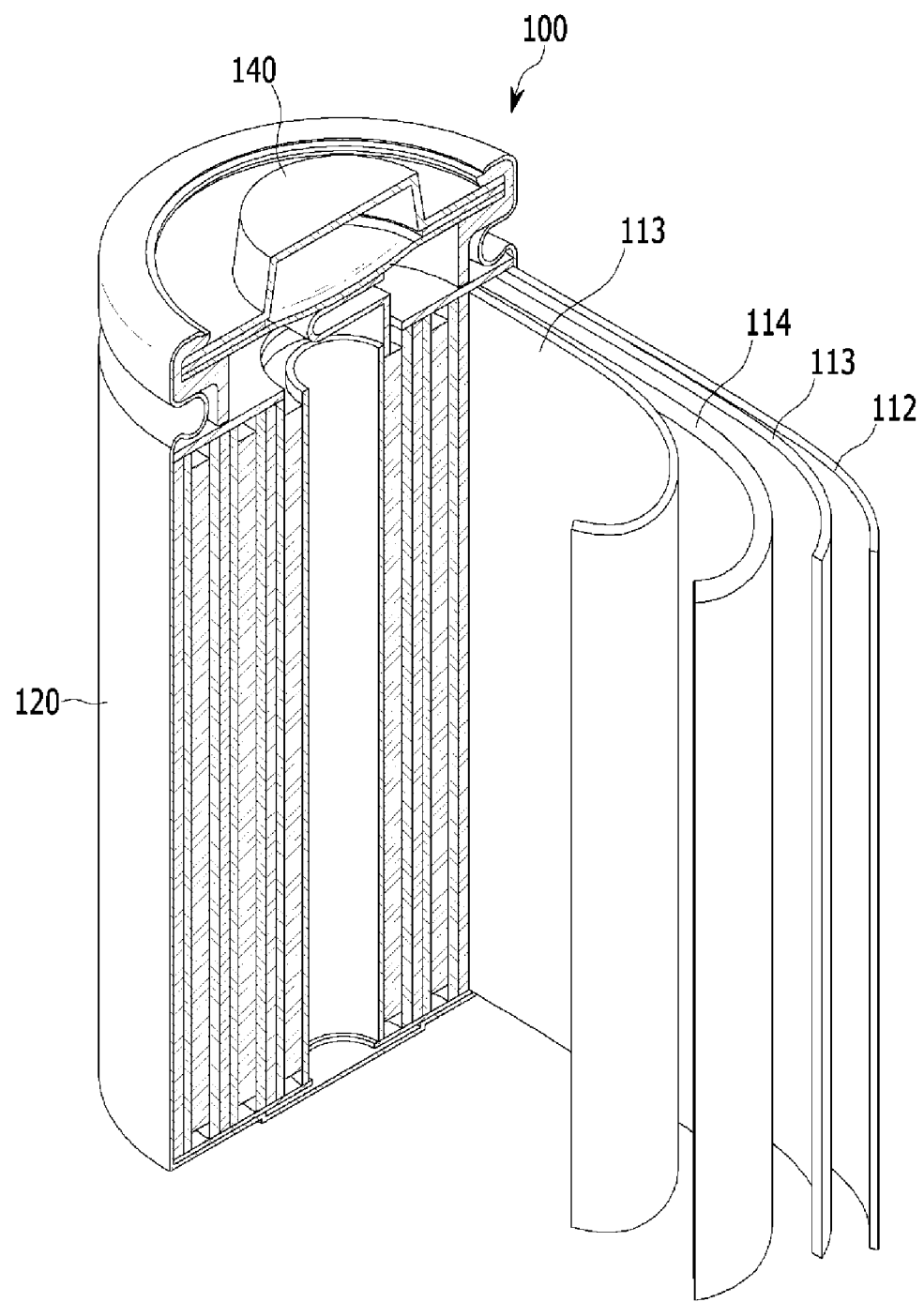

SEPARATOR FOR LITHIUM SECONDARY BATTERY AND LITHIUM SECONDARY BATTERY COMPRISING SAME

CROSS-REFERENCE TO RELATED APPLICATIONS

This application is a U.S. National Phase Patent Application of International Application Number PCT/KR2019/009136, filed on Jul. 24, 2019, which claims priority to Korean Patent Application Number 10-2018-0169182, filed on Dec. 26, 2018, the entire content of both of which is incorporated herein by reference.

TECHNICAL FIELD

A separator for a lithium secondary battery and a lithium secondary battery including the same are disclosed.

BACKGROUND ART

A separator for an electrochemical battery is an intermediate film that separates a positive electrode and a negative electrode in a battery, and maintains ion conductivity continuously to enable charge and discharge of a battery. When a battery is exposed to a high temperature environment due to abnormal behavior, a separator may be mechanically shrinks or is damaged due to melting characteristics at a low temperature. Herein, the positive and negative electrodes contact each other and may cause an explosion of the battery. In order to overcome this problem, technology of suppressing shrinkage of a separator and ensuring stability of a battery is required.

For example, a method of increasing heat resistance of the separator by coating the separator with a mixture of inorganic particles having a large heat resistance and an organic binder having adherence is well known. However, this conventional method may not sufficiently secure desired adherence and not uniformly applied to variously-sized separators.

DISCLOSURE

A separator for a lithium secondary battery having improved air permeability, heat resistance, and adherence, and a lithium secondary battery including the same are provided.

An embodiment provides a separator for a lithium secondary battery including a porous substrate; and a coating layer on at least one surface of the porous substrate, wherein the coating layer includes a (meth)acrylic copolymer including a first structural unit derived from (meth)acrylamide, a second structural unit derived from (meth)acrylonitrile, and a third structural unit derived from (meth)acrylamido sulfonic acid, (meth)acrylamido sulfonic acid salt, or a combination thereof, the first structural unit is included in an amount of 55 mol % to 90 mol % based on 100 mol % of the (meth)acrylic copolymer, the second structural unit and third structural unit are each independently in each amount of 5 mol % to 40 mol % based on 100 mol % of the (meth)acrylic copolymer, and the (meth)acrylic copolymer has a weight average molecular weight of 200,000 to 700,000.

The second structural unit derived from (meth)acrylonitrile may be included in an amount of 5 to 40 mol % based on 100 mol % of the (meth)acrylic copolymer and the third structural unit derived from (meth)acrylamido sulfonic acid, (meth)acrylamido sulfonic acid salt, or a combination thereof may be included in an amount of 5 to 10 mol % based on 100 mol % of the (meth)acrylic copolymer.

The first structural unit derived from (meth)acrylamide may be included in an amount of 80 mol % to 90 mol % based on 100 mol % of the (meth)acrylic copolymer, the second structural unit derived from (meth)acrylonitrile may be included in an amount of 5 mol % to 15 mol % based on 100 mol % of the (meth)acrylic copolymer, and the third structural unit derived from (meth)acrylamido sulfonic acid, (meth)acrylamido sulfonic acid salt, or a combination thereof may be included in an amount of 5 to 10 mol % based on 100 mol % of the (meth)acrylic copolymer.

The first structural unit derived from (meth)acrylamide may be represented by Chemical Formula 1, the second structural unit derived from (meth)acrylonitrile may be represented by Chemical Formula 2, and the third structural unit derived from (meth)acrylamido sulfonic acid, (meth)acrylamido sulfonic acid salt, or a combination thereof may be represented by one of Chemical Formula 3, Chemical Formula 4, Chemical Formula 5, and a combination thereof:

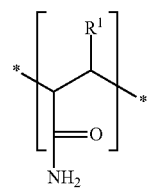

[Chemical Formula 1]

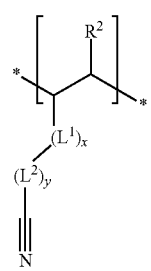

[Chemical Formula 2]

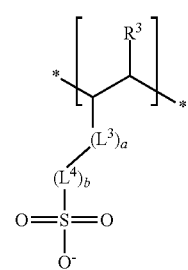

[Chemical Formula 3]

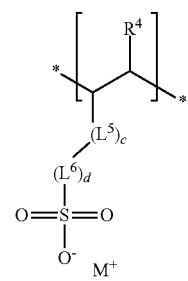

[Chemical Formula 4]

-continued

[Chemical Formula 5]

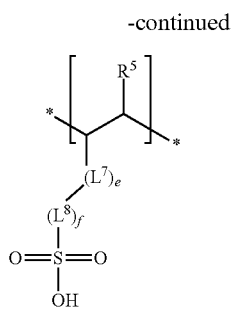

In Chemical Formula 1 to Chemical Formula 5, $R^1$ is hydrogen or a methyl group, $R^2$, $R^3$, $R^4$, and $R^5$ are each independently hydrogen or a C1 to C3 alkyl group, $L^1$, $L^3$, $L^5$, and $L^7$ are each independently —C(=O)—, —C(=O)O—, —OC(=O)—, —O—, or —C(=O)NH—, $L^2$, $L^4$, $L^6$, and $L^8$ are each independently a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, x and y are each independently an integer of 0 to 2, a, b, c, d, e, and f are each independently an integer of 0 to 2, and $M^+$ is an alkali metal.

The (meth)acrylic copolymer may have a glass transition temperature of 150° C. to 180° C.

The (meth)acrylic copolymer may be included in an amount of 1 to 5 wt % based on a total amount of the coating layer.

The coating layer may further include inorganic particles.

The (meth)acrylic copolymer:inorganic particles may be included in a weight ratio of 1:20 to 1:40.

The inorganic particles may include $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite, or a combination thereof.

The coating layer may have a thickness of 1 to 5 μm.

Another embodiment provides a lithium secondary battery including a positive electrode, a negative electrode, and the separator for secondary battery between the positive electrode and the negative electrode.

A lithium secondary battery including a separator for a lithium secondary battery having excellent heat resistance and adherence while stably securing air permeability may be implemented.

DESCRIPTION OF THE DRAWINGS

FIG. 1 is an exploded perspective view of a lithium secondary battery according to one embodiment.

MODE FOR INVENTION

Hereinafter, embodiments of the present invention are described in detail. However, these embodiments are exemplary, the present invention is not limited thereto and the present invention is defined by the scope of claims.

In the present specification, when a definition is not otherwise provided, "substituted" refers to replacement of hydrogen of a compound by a substituent selected from a halogen atom (F, Br, Cl, or I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C30 aryl group, a C7 to C30 arylalkyl group, a C1 to C4 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C2 to C20 heterocycloalkyl group, and a combination thereof.

In the present specification, when a definition is not otherwise provided, the term 'hetero' refers to one including 1 to 3 heteroatoms selected from N, O, S, and P.

In addition, in the present specification, when a definition is not otherwise provided, 'heterocyclic group' refers to a substituted or unsubstituted C3 to C20 heterocycloalkylene group or a substituted or unsubstituted C6 to C20 heteroarylene group.

In addition, in the present specification, "(meth)acrylic" refers to acrylic or methacrylic.

A separator for a lithium secondary battery according an embodiment includes a porous substrate; and a coating layer on at least one surface of the porous substrate.

The porous substrate may have a plurality of pore and may generally be a porous substrate used in an electrochemical device. Non-limiting examples of the porous substrate may be a polymer film formed of a polymer selected from polyolefin such as polyethylene, polypropylene, and the like, a polyester such as polyethylene terephthalate, polybutylene terephthalate, and the like, polyacetal, polyamide, polyimide, polycarbonate, polyetheretherketone, polyaryletherketone, polyetherimide, polyamideimide, polybenzimidazole, polyether sulfone, polyphenylene oxide, a cyclic olefin copolymer, polyphenylene sulfide, polyethylene naphthalate, a glass fiber, Teflon, and polytetrafluoroethylene, or a copolymer or a mixture of two or more.

The porous substrate may be for example a polyolefin-based substrate, and the polyolefin-based substrate may improve has safety of a battery due to its improved shutdown function. The polyolefin-based substrate may be for example selected from a polyethylene single film, a polypropylene single film, a polyethylene/polypropylene double film, a polypropylene/polyethylene/polypropylene triple film, and a polyethylene/polypropylene/polyethylene triple film. In addition, the polyolefin-based resin may include a non-olefin resin in addition to an olefin resin or a copolymer of olefin and a non-olefin monomer.

The porous substrate may have a thickness of about 1 μm to 40 μm, for example 1 μm to 30 μm, 1 μm to 20 μm, 5 μm to 15 μm, or 10 μm to 15 μm.

The coating layer according to an embodiment may be present on one surface of the substrate in contact with the positive electrode, on one surface of the substrate in contact with the negative electrode, or on both surfaces of the substrate in order to bind of the electrode and the separator. Accordingly, the interface resistance between the electrode and the separator may be reduced, and adherence of the separator may be improved.

The coating layer according to an embodiment includes a (meth)acrylic copolymer including a first structural unit derived from (meth)acrylamide, and a second structural unit derived from (meth)acrylonitrile, and a third structural unit derived from (meth)acrylamido sulfonic acid, (meth)acrylamido sulfonic acid salt, or a combination thereof.

The first structural unit derived from (meth)acrylamide includes an amide functional group (—$NH_2$) in the structural unit. The —$NH_2$ functional group may improve the adhesion properties of the porous substrate to the electrode, and by forming a hydrogen bond with the —OH functional group of the inorganic particles described later, the inorganic particles may be more firmly fixed in the coating layer and thus heat resistance may be enhanced.

The structural unit derived from the (meth)acrylonitrile included in the second structural unit may improve oxidation resistance of the separator including the same and reduce the moisture content.

The structural unit derived from the (meth)acrylamido sulfonic acid, (meth)acrylamido sulfonic acid salt, or combination thereof included in the third structural unit includes a bulky functional group, thereby reducing the mobility of the copolymer including the same, the heat resistance of the separator may be enhanced.

The first structural unit may be included in an amount of 55 mol % to 90 mol %, for example, greater than or equal to 55 mol %, greater than or equal to 59 mol %, greater than or equal to 64 mol %, greater than or equal to 69 mol %, or greater than or equal to 74 mol %, and less than or equal to 90 mol %, less than or equal to 86 mol %, less than or equal to 81 mol %, or less than or equal to 76 mol % based on 100 mol % of the (meth)acrylic copolymer.

The second structural unit may be included in an amount of 5 mol % to 40 mol %, for example, greater than or equal to 5 mol %, greater than or equal to 9 mol %, greater than or equal to 14 mol %, or greater than or equal to 19 mol % and less than or equal to 40 mol %, less than or equal to 36 mol %, less than or equal to 31 mol %, less than or equal to 26 mol %, or less than or equal to 21 mol % based on 100 mol % of the (meth)acrylic copolymer.

The third structural unit may be included in an amount of 5 to 40 mol %, for example, greater than or equal to 5 mol %, greater than or equal to 9 mol %, or greater than or equal to 14 mol % and less than or equal to 40 mol %, less than or equal to 36 mol %, less than or equal to 31 mol %, less than or equal to 26 mol %, less than or equal to 21 mol %, or less than or equal to 16 mol % based on 100 mol % of the (meth)acrylic copolymer.

For example, the structural unit derived from (meth) acrylamide may be included in an amount of 80 mol % to 90 mol % based on 100 mol % of the (meth)acrylic copolymer, the structural unit derived from (meth)acrylonitrile may be included in an amount of 5 mol % to 15 mol % based on 100 mol % of the (meth)acrylic copolymer, and the structural unit derived from the (meth)acrylamido sulfonic acid, (meth)acrylamido sulfonic acid salt, or combination thereof may be included in an amount of 5 to 10 mol % based on 100 mol % of the (meth)acrylic copolymer.

When the content of each structural unit is within the above ranges, heat resistance and adherence of the separator may be further improved.

The first structural unit derived from the (meth)acrylamide may be, for example, represented by Chemical Formula 1.

[Chemical Formula 1]

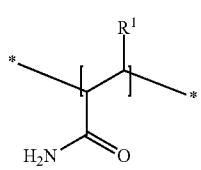

In Chemical Formula 1, $R^1$ is hydrogen or a C1 to C6 alkyl group.

The structural unit derived from the (meth)acrylonitrile may be represented by Chemical Formula 2.

[Chemical Formula 2]

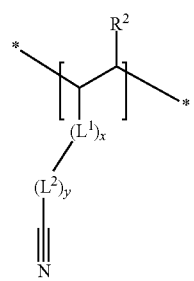

In Chemical Formula 2, $R^2$ is hydrogen or C1 to C3 alkyl group, $L^1$ is —C(=O)—, —C(=O)O—, —OC(=O)—, —O—, or —C(=O)NH—, $L^2$ is a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, and x and y are each independently an integer of 0 to 2.

The structural unit derived from the (meth)acrylonitrile may be, for example, a structural unit derived from (meth) acrylonitrile or cyanoalkyl (meth)acrylate. Herein, the alkyl may be a C1 to C20 alkyl, a C1 to C10 alkyl, or a C1 to C6 alkyl.

The cyanoalkyl (meth)acrylate may be, for example, cyanomethyl (meth) acrylate, cyanoethyl (meth) acrylate, cyanopropyl (meth) acrylate, or cyanooctyl (meth) acrylate.

The structural unit derived from the (meth)acrylamido sulfonic acid, (meth)acrylamido sulfonic acid salt, or a combination thereof may be a structural unit derived from (meth)acrylamidosulfonic acid or (meth)acrylamidosulfonate and the (meth)acrylamidosulfonate may be a conjugate base of (meth)acrylamidosulfonic acid, (meth)acrylamido sulfonic acid salt, or a derivative thereof. The structural unit derived from the (meth)acrylamidosulfonic acid or (meth)acrylamidosulfonate may be, for example, represented by one of Chemical Formula 3, Chemical Formula 4, Chemical Formula 5, and a combination thereof.

[Chemical Formula 3]

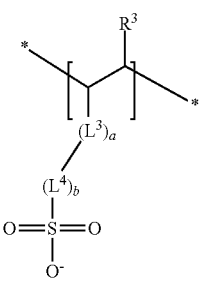

[Chemical Formula 4]

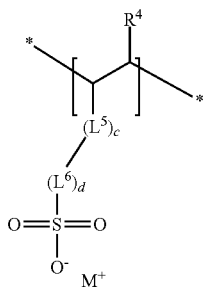

[Chemical Formula 5]

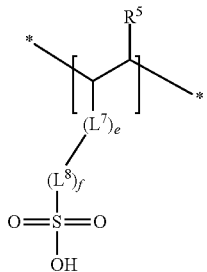

In Chemical Formula 3 to Chemical Formula 5, $R^3$, $R^4$, and $R^5$ are each independently hydrogen or a C1 to C3 alkyl group, $L^3$, $L^5$, and $L^7$ are each independently —C(=O)—, —C(=O)O—, —OC(=O)—, —O—, or —C(=O)NH—, $L^4$, $L^6$, and $L^8$ are each independently a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, a, b, c, d, e, and f are each independently an integer of 0 to 2, and M is an alkali metal, wherein the alkali metal may be, for example, lithium, sodium, potassium, rubidium, or cesium.

For example, in Chemical Formula 3 to Chemical Formula 5, $L^3$, $L^5$, and $L^7$ may all be —C(=O)NH—, $L^4$, $L^6$, and $L^8$ may each independently be a substituted or unsubstituted C1 to C10 alkylene, and a, b and c may each be 1.

The structural unit derived from the (meth)acrylamidosulfonic acid, (meth)acrylamidosulfonic acid salt, or a combination thereof may include each of the structural unit represented by Chemical Formula 3, the structural unit represented by Chemical Formula 4, and the structural unit represented by Chemical Formula 5, or may include two or more types thereof together. As one example, the structural unit represented by Chemical Formula 4 may be included, and as another example, the structural unit represented by Chemical Formula 4 and the structural unit represented by Chemical Formula 5 may be included together.

When the structural unit represented by Chemical Formula 4 and the structural unit represented by Chemical Formula 5 are included together, the structural unit represented by Chemical Formula 4 and the structural unit represented by Chemical Formula 5 may be included in a mole ratio of 10:1 to 1:2, desirably 5:1 to 1:1, and more desirably 3:1 to 1:1.

The sulfonate group in the structural unit derived from the (meth)acrylamidosulfonic acid, (meth)acrylamidosulfonic acid salt, or a combination thereof may be, for example, a functional group derived from vinyl sulfonic acid, allyl sulfonic acid, styrene sulfonic acid, anethol sulfonic acid, acrylamidoalkane sulfonic acid, sulfoalkyl (meth)acrylate, or a salt thereof.

Herein, the alkane may be a C1 to C20 alkane, a C1 to C10 alkane, or a C1 to C6 alkane, and the alkyl may be a C1 to C20 alkyl, a C1 to C10 alkyl, or a C1 to C6 alkyl. The salt refers to a salt composed of the aforementioned sulfonic acid and appropriate ions. The ions may be, for example, alkali metal ions, and in this case, the salt may be an alkali metal sulfonate salt.

The acrylamidoalkane sulfonic acid may be, for example, 2-acrylamido-2-methylpropane sulfonic acid and the sulfoalkyl (meth)acrylate may be, for example, 2-sulfoethyl (meth)acrylate, 3-sulfopropyl (meth)acrylate, and the like.

The (meth)acrylic copolymer may be represented by Chemical Formula 6.

[Chemical Formula 6]

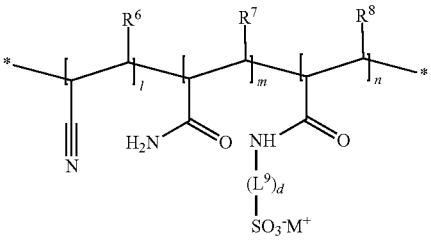

In Chemical Formula 6, $R^6$ to $R^8$ are each independently hydrogen or a methyl group, $L^9$ is a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, d is one of integers of 0 to 2, M is an alkali metal such as lithium, sodium, potassium, rubidium, or cesium, and the like, and l, m, and n indicate mole ratios of each unit.

For example, in Chemical Formula 6, l+m+n may be 1. In addition, for example, it may be $0.1 \leq (l+n) \leq 0.45$, $0.55 \leq m \leq 0.9$, specifically $0.05 \leq l \leq 0.40$, and $0.05 \leq n \leq 0.40$, for example, $0.55 \leq m \leq 0.9$, $0.05 \leq l \leq 0.15$, and $0.05 \leq n \leq 0.1$.

The structural unit in which the alkali metal ($M^+$) is substituted in the (meth)acrylic copolymer may be present in an amount of 50 to 100 mol %, for example 60 to 90 mol %, or 70 to 90 mol % based on 100 mol % of the total amount of the (meth)acrylamidosulfonic acid structural unit. When the degree of substitution of the alkali metal satisfies the above ranges, the (meth)acrylic copolymer and the separator including the same may exhibit excellent adherence, heat resistance, and oxidation resistance.

The (meth)acrylic copolymer may further include other structural units in addition to the structural units described above. For example, the (meth)acrylic copolymer may further include a structural unit derived from an alkyl (meth)acrylate, a structural unit derived from a diene-based compound, a structural unit derived from a styrene-based compound, a structural unit containing an ester group, a structural unit containing a carbonate group, or a combination thereof.

The (meth)acrylic copolymer may be in various forms, such as an alternating polymer in which the structural units are alternately distributed, a random polymer randomly distributed, or a graft polymer in which some structural units are grafted.

The (meth)acrylic copolymer may have a glass transition temperature of 150° C. to 180° C., for example, 155° C. to 180° C., 160° C. to 180° C., or 165° C. to 180° C. When the glass transition temperature of the (meth)acrylic copolymer falls within the above ranges, the (meth)acrylic copolymer and a separator including the same may have excellent adherence, heat resistance, and air permeability.

The weight average molecular weight of the (meth)acrylic copolymer may be 200,000 to 700,000, for example greater than or equal to 200,000, greater than or equal to 210,000, greater than or equal to 220,000, greater than or equal to 230,000, greater than or equal to 240,000, greater than or equal to 250,000, greater than or equal to 260,000, greater than or equal to 270,000, greater than or equal to 280,000, greater than or equal to 290,000, greater than or equal to 300,000, greater than or equal to 330,000, greater than or equal to 360,000, greater than or equal to 390,000, greater than or equal to 400,000, or greater than or equal to 410,000, and less than or equal to and 700,000, less than or equal to 690,000, less than or equal to 680,000, less than or equal to 670,000, less than or equal to 660,000, less than or equal to 650,000, less than or equal to 640,000, less than or equal to 630,000, less than or equal to 620,000, less than or equal to 610,000, less than or equal to 600,000, less than or equal to 590,000, less than or equal to 570,000, less than or equal to 550,000, less than or equal to 530,000, less than or equal to 510,000, less than or equal to 500,000, or less than or equal to 490,000. When the weight average molecular weight of the (meth)acrylic copolymer satisfies the above ranges, the (meth)acrylic copolymer and a separator including the (meth)acrylic copolymer may have excellent adherence, heat resistance, and air permeability.

The weight average molecular weight may be polystyrene-reduced average molecular weight measured by gel permeation chromatography.

The (meth)acrylic copolymer may be prepared by various methods such as emulsion polymerization, suspension polymerization, massive polymerization, solution polymerization, or bulk polymerization.

The (meth)acrylic copolymer may be included in an amount of 1 to 5 wt %, for example, 2 to 5 wt % based on a total amount of the coating layer. When the (meth)acrylic copolymer is included within the range, the (meth)acrylic copolymer and a separator including the same may have excellent adherence, heat resistance, and air permeability.

The coating layer may further include inorganic particles together with the (meth)acrylic copolymer.

In the coating layer, the (meth)acrylic copolymer: inorganic particles may be included in a weight ratio of 1:20 to 1:40, for example, in a weight ratio of 1:20 to 1:35 or 1:20 to 1:30. When the (meth)acrylic copolymer and inorganic particles are included in the weight ratios in the coating layer, the separator may have excellent heat resistance and air permeability. Since the coating layer includes the inorganic particles, the separator can be prevented from being rapidly contracted or deformed due to an increase in temperature by improving heat resistance.

The inorganic particles may include, for example, $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite, or a combination thereof, but are not limited thereto. The inorganic particles may have a spherical shape, a sheet shape, a cubic shape, or an amorphous shape. The inorganic particles may have an average particle diameter of 1 nm to 2500 nm, within the range, 100 nm to 2000 nm, or 200 nm to 1000 nm, for example about 300 nm to 800 nm. On the other hand, the average particle diameter may be particle size ($D_{50}$) at a volume ratio of 50% in a cumulative size-distribution curve. By using the inorganic particles having an average particle diameter within the ranges, the coating layer may have an appropriate strength, and the separator may have improved heat resistance, durability, and stability.

The inorganic particles may be included in an amount of 50 wt % to 99 wt % based on the coating layer. In an embodiment, the inorganic particles may be included in an amount of 70 wt % to 99 wt %, for example 80 wt % to 99 wt %, 85 wt % to 99 wt %, 90 wt % to 99 wt %, or 95 wt % to 99 wt % based on the coating layer. When the inorganic particles are included within the ranges, the separator for a lithium secondary battery according to an embodiment may have improved heat resistance, durability, and stability.

Meanwhile, the coating layer may further include a crosslinked binder having a crosslinked structure in addition to the (meth)acrylic copolymer. The crosslinked binder may be obtained from a monomer, an oligomer, and/or a polymer having a curable functional group capable of reacting with heat and/or light, for example, a multi-functional monomer, a multi-functional oligomer, and/or a multi-functional polymer having at least two curable functional groups. The curable functional group may include a vinyl group, a (meth)acrylate group, an epoxy group, an oxetane group, an ether group, a cyanate group, an isocyanate group, a hydroxy group, a carboxyl group, a thiol group, an amino group, an alkoxy group, or a combination thereof but is not limited thereto.

The crosslinked binder may be for example, obtained by curing a monomer, an oligomer and/or a polymer including at least two (meth)acrylate groups, and may be for example obtained by curing ethylene glycol di(meth)acrylate, propylene glycol di(meth)acrylate, polyethylene glycol di(meth)acrylate, polypropylene glycol di(meth)acrylate, butanediol di(meth)acrylate, hexamethylene glycol di(meth)acrylate, trimethylolpropane tri(meth)acrylate, glycerine tri (meth)acrylate, pentaerythritol tetra(meth)acrylate, diglycerine hexa(meth)acrylate, or a combination thereof.

For example, the crosslinked binder may be obtained from a monomer, an oligomer and/or a polymer including at least two epoxy groups, for example bisphenol A diglycidyl ether, bisphenol F diglycidyl ether, hexahydrophthalic acid glycidyl ester, or a combination thereof.

For example, the crosslinked binder may be obtained from a monomer, an oligomer and/or a polymer including at least two isocyanate groups, for example diphenylmethane diisocyanate, 1,6-hexamethylene diisocyanate, 2,2,4(2,2,4)-trimethyl hexamethylene diisocyanate, phenylene diisocyanate, 4,4'-dicyclohexylmethane diisocyanate, 3,3'-dimethyldiphenyl-4,4'-diisocyanate, xylene diisocyanate, naphthalene diisocyanate, 1,4-cyclohexyl diisocyanate, or a combination thereof.

In addition, the coating layer may further include a non-crosslinked binder in addition to the (meth)acrylic copolymer. The non-crosslinked binder may be for example a vinylidenefluoride-based polymer, polymethylmethacrylate, polyacrylonitrile, polyvinylpyrrolidone, polyvinylacetate, a polyethylene-vinylacetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxylmethyl cellulose, an acrylonitrile-styrene-butadiene copolymer, or a combination thereof, but is not limited thereto.

The vinylidene fluoride-based polymer may be specifically a homopolymer including only vinylidene fluoride monomer-derived unit or a copolymer of a vinylidene fluoride-derived unit and other monomer-derived unit. The copolymer may specifically include a vinylidene fluoride-derived unit and at least one of units derived from chlorotrifluoroethylene, trifluoroethylene, hexafluoropropylene, ethylene tetrafluoride and ethylene monomers, but is not limited thereto. For example, the copolymer may be a polyvinylidene fluoride-hexafluoropropylene (PVdF-HFP) copolymer including a vinylidene fluoride monomer-derived unit and a hexafluoropropylene monomer-derived unit.

For example, the non-crosslinked binder may be a polyvinylidene fluoride (PVdF) homopolymer, a polyvinylidene fluoride-hexafluoropropylene (PVdF-HFP) copolymer, or a combination thereof. In this case, adherence between the porous substrate and the coating layer is increased, stability of the separator and impregnation properties of an electrolyte solution are improved, and thus high-rate charge and discharge characteristics of a battery is improved.

The coating layer may have a thickness of about 1 μm to 5 μm, for example 1.5 μm to 3 μm.

A ratio of a thickness of the coating layer to a thickness of the porous substrate may be 0.05 to 0.5, for example 0.05 to 0.4, or 0.05 to 0.3, or 0.1 to 0.2. In this case, the separator including the porous substrate and the coating layer may exhibit excellent air permeability, heat resistance, and adherence.

The separator for a lithium secondary battery according to an embodiment has excellent heat resistance. Specifically, the separator may have a shrinkage rate of less than 10% or less than or equal to 5% at a high temperature. For example, after leaving the separator at 130° C. to 170° C., for example at 150° C. for 20 to 70 minutes or 60 minutes, the shrinkage rate in the machine direction of the separator may be less than 10%, and the shrinkage rate in the traverse direction may be less than 5%.

The separator for a lithium secondary battery according to an embodiment may exhibit excellent air permeability, and specifically less than 160 sec/100 cc·1 μm, for example less than or equal to 150 sec/100 cc·1 μm, or less than or equal to 140 sec/100 cc·1 μm per unit thickness. Here, the air permeability refers to the time (seconds) it takes for 100 cc of air to pass through the unit thickness of the separator. The air permeability per unit thickness may be obtained by measuring the air permeability for the total thickness of the separator and dividing it by the thickness.

The separator for a lithium secondary battery according to an embodiment may be manufactured by known various methods. For example, the separator for a lithium secondary battery may be formed by coating a composition for forming a coating layer on one surface or both surfaces of the porous substrate and drying the same.

The composition for forming the coating layer may include the (meth)acrylic copolymer, inorganic particles, and a solvent. The solvent is not particularly limited if the solvent may dissolve or disperse the (meth)acrylic copolymer and the inorganic particles. In an embodiment, the solvent may be an aqueous solvent including water, an alcohol, or a combination thereof, which is environmentally-friendly.

The coating may be, for example spin coating, dip coating, bar coating, die coating, slit coating, roll coating, inkjet printing, and the like, but is not limited thereto.

The drying may be for example performed through natural drying, drying with warm air, hot air, or low humid air, vacuum-drying, or radiation of a far-infrared ray, an electron beam, and the like, but the present disclosure is not limited thereto. The drying may be for example performed at a temperature of 25° C. to 120° C.

The separator for a lithium secondary battery may be manufactured by lamination, coextrusion, and the like besides the above method.

Hereinafter, a lithium secondary battery including the aforementioned separator for a lithium secondary battery is described.

A lithium secondary battery may be classified into a lithium ion battery, a lithium ion polymer battery, and a lithium polymer battery depending on kinds of a separator and an electrolyte. It also may be classified to be cylindrical, prismatic, coin-type, pouch-type, and the like depending on shape. In addition, it may be bulk type and thin film type depending on sizes. Structures and manufacturing methods for lithium ion batteries pertaining to this disclosure are well known in the art.

Herein, as an example of a lithium secondary battery, a cylindrical lithium secondary battery is for example described. FIG. 1 is an exploded perspective view of a lithium secondary battery according to one embodiment. Referring to FIG. 1, a lithium secondary battery 100 according to an embodiment includes a battery cell including a negative electrode 112, a positive electrode 114 facing the negative electrode 112, a separator 113 between the negative electrode 112 and the positive electrode 114, and an electrolyte (not shown) impregnating the negative electrode 112, the positive electrode 114, and the separator 113, a battery case 20 housing the battery cell, and a sealing member 140 sealing the battery case.

The positive electrode 114 includes a positive current collector and a positive active material layer formed on the positive current collector. The positive active material layer includes a positive active material, a binder, and optionally a conductive material.

The positive current collector may use aluminum, nickel, and the like, but is not limited thereto.

The positive active material may use a compound capable of intercalating and deintercalating lithium. Specifically, at least one of a composite oxide or a composite phosphate of a metal selected from cobalt, manganese, nickel, aluminum, iron, or a combination thereof and lithium may be used. For example, the positive active material may be a lithium cobalt oxide, a lithium nickel oxide, a lithium manganese oxide, a lithium nickel cobalt manganese oxide, a lithium nickel cobalt aluminum oxide, a lithium iron phosphate, or a combination thereof.

The binder improves binding properties of positive active material particles with one another and with a current collector, and specific examples may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto. These may be used alone or as a mixture of two or more.

The conductive material improves conductivity of an electrode. Examples thereof may be natural graphite, artificial graphite, carbon black, a carbon fiber, a metal powder, a metal fiber, and the like, but are not limited thereto. These may be used alone or as a mixture of two or more. The metal powder and the metal fiber may use a metal of copper, nickel, aluminum, silver, and the like.

The negative electrode 112 includes a negative current collector and a negative active material layer formed on the negative current collector.

The negative current collector may use copper, gold, nickel, a copper alloy, and the like, but is not limited thereto.

The negative active material layer may include a negative active material, a binder, and optionally a conductive material. The negative active material may be a material that reversibly intercalates/deintercalates lithium ions, a lithium metal, a lithium metal alloy, a material capable of doping and dedoping lithium, a transition metal oxide, or a combination thereof.

The material that reversibly intercalates/deintercalates lithium ions may be a carbon material which is any generally-used carbon-based negative active material, and examples thereof may be crystalline carbon, amorphous carbon, or a combination thereof. Examples of the crystalline carbon may be may be graphite such as amorphous, sheet-shaped, flake-shaped, spherically shaped, or fiber-shaped natural graphite or artificial graphite. Examples of the amorphous carbon may be soft carbon or hard carbon, a mesophase pitch carbonized product, fired coke, and the like. The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn. The material being capable of doping and dedoping lithium may be Si, $SiO_x$ (0<x<2), a Si—C composite, a Si—Y alloy, Sn, $SnO_2$, a Sn—C composite, Sn—Y, and the like, and at least one of these may be mixed with $SiO_2$. Specific examples of the element Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, TI, Ge, P, As, Sb, Bi, S, Se, Te, Po, and a combination thereof. The transition metal oxide may be vanadium oxide, lithium vanadium oxide, and the like.

The binder and the conductive material used in the negative electrode 112 may be the same as the binder and conductive material of the aforementioned positive electrode 114.

The positive electrode 114 and the negative electrode 112 may be manufactured by mixing each active material composition including each active material and a binder, and optionally a conductive material in a solvent, and coating the active material composition on each current collector. Herein, the solvent may be N-methylpyrrolidone, and the like, but is not limited thereto. The electrode manufacturing method is well known, and thus is not described in detail in the present specification.

The electrolyte includes an organic solvent a lithium salt.

The organic solvent serves as a medium for transmitting ions taking part in the electrochemical reaction of a battery. The organic solvent may for example be a carbonate-based solvent, an ester-based solvent, an ether-based solvent, a ketone-based solvent, an alcohol-based solvent, or an aprotic solvent. The carbonate-based solvent may be dimethyl carbonate, diethyl carbonate, dipropyl carbonate, methylpropyl carbonate, ethylpropyl carbonate, methylethyl carbonate, ethylene carbonate, propylene carbonate, butylene carbonate, and the like, and the ester-based solvent may be methyl acetate, ethyl acetate, n-propyl acetate, 1,1-dimethylethyl acetate, methylpropionate, ethylpropionate, γ-butyrolactone, decanolide, valerolactone, mevalonolactone, caprolactone, and the like. The ether-based solvent may be dibutyl ether, tetraglyme, diglyme, dimethoxyethane, 2-methyltetrahydrofuran, tetrahydrofuran, and the like, and the ketone-based solvent may be cyclohexanone, and the like. The alcohol-based solvent may be ethanol, isopropyl alcohol, and the like, and the aprotic solvent may be nitriles such as R—CN (R is a C2 to C20 linear, branched, or cyclic hydrocarbon group, a double bond, an aromatic ring, or an ether bond), and the like, amides such as dimethyl formamide, dioxolanes such as 1,3-dioxolane, sulfolanes, and the like.

The organic solvent may be used alone or in a mixture of two or more, and when the organic solvent is used in a mixture of two or more, the mixture ratio may be controlled in accordance with a desirable cell performance.

The lithium salt is dissolved in an organic solvent, supplies lithium ions in a battery, basically operates the lithium secondary battery, and improves lithium ion transportation between positive and negative electrodes therein. Examples of the lithium salt may include $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (x and y are natural numbers), LiCl, LiI, $LiB(C_2O_4)_2$, or a combination thereof, but are not limited thereto.

The lithium salt may be used in a concentration ranging from 0.1 M to 2.0 M. When the lithium salt is included within the above concentration range, an electrolyte may have excellent performance and lithium ion mobility due to optimal electrolyte conductivity and viscosity.

Hereinafter, the above aspects of the present disclosure are illustrated in more detail with reference to examples. However, these examples are exemplary, and the present disclosure is not limited thereto.

Synthesis Example: Synthesis of Acrylic Copolymer

Synthesis Example 1: AM/AN/AMPS=85/10/5, Weight Average Molecular Weight: 410,000, Glass Transition Temperature: 165° C.

Distilled water (6361 g), acrylamide (604.2 g, 8.5 mol), potassium persulfate (2.7 g, 0.01 mol), 2-acrylamido-2-methylpropanesulfonic acid (103.6 g, 0.5 mol), and a 5 N lithium hydroxide aqueous solution (1.05 equivalent based on a total amount of 2-acrylamido-2-methylpropanesulfonic acid) were added to a 10 L four-necked flask equipped with a stirrer, a thermometer, and a cooling tube, and after three times repeating an operation of reducing the internal pressure to 10 mmHg with a diaphragm pump and then, returning it to a normal pressure with nitrogen, acrylonitrile (53.1 g, 1.0 mol) was added thereto.

A reaction was performed for 12 hours, while adjusting the temperature of the reaction solution to be stabilized between 55° C. and 60° C., and cooled to room temperature.

By this method, poly(acrylamide-co-acrylonitrile-co-2-acrylamido-2-methylpropanesulfonic acid) lithium salt was prepared. A mole ratio of acrylamide, acrylonitrile, and 2-acrylamido-2-methylpropanesulfonic acid was 85:10:5. About 10 mL of the reaction solution (reaction product) was taken to measure the non-volatile component, and the result was 9.5% (theoretical value: 10%).

Synthesis Example 2: AM/AN/AMPS=75/20/5, Weight Average Molecular Weight: 402,000, Glass Transition Temperature: 169° C.

An acrylic copolymer was prepared according to the same method as Synthesis Example 1 except that acrylamide (533.1 g, 7.5 mol), acrylonitrile (106.1 g, 2.0 mol), and 2-acrylamido-2-methylpropanesulfonic acid (103.6 g, 0.5 mol) were used. A mole ratio of acrylamide, acrylonitrile, and 2-acrylamido-2-methylpropanesulfonic acid was 75:20:5. About 10 mL of the reaction solution (reaction product) was taken to measure the non-volatile component, and the result was 9.5% (theoretical value: 10%).

Synthesis Example 3: AM/AN/AMPS=65/30/5,
Weight Average Molecular Weight: 404,000, Glass
Transition Temperature: 174° C.

An acrylic copolymer was prepared according to the same method as Synthesis Example 1 except that acrylamide (462.0 g, 6.5 mol), acrylonitrile (159.2 g, 3.0 mol), and 2-acrylamido-2-methylpropanesulfonic acid (103.6 g, 0.5 mol) were used. A mole ratio of acrylamide, acrylonitrile, and 2-acrylamido-2-methylpropanesulfonic acid was 65:30:5. About 10 mL of the reaction solution (reaction product) was taken to measure the non-volatile component, and the result was 9.5% (theoretical value: 10%).

Synthesis Example 4: AM/AN/AMPS=55/40/5,
Weight Average Molecular Weight: 411,000, Glass
Transition Temperature: 178° C.

An acrylic copolymer was prepared according to the same method as Synthesis Example 1 except that acrylamide (390.9 g, 5.5 mol), acrylonitrile (212.2 g, 4.0 mol), and 2-acrylamido-2-methylpropanesulfonic acid (103.6 g, 0.5 mol) were used. A mole ratio of acrylamide, acrylonitrile, and 2-acrylamido-2-methylpropanesulfonic acid was 55:40:5. About 10 mL of the reaction solution (reaction product) was taken to measure the non-volatile component, and the result was 9.5% (theoretical value: 10%).

Synthesis Example 5: AM/AN/AMPS=85/10/5,
Weight Average Molecular Weight: 612,000, Glass
Transition Temperature: 170° C.

An acrylic copolymer was prepared according to the same method as Synthesis Example 1 except that acrylamide (604.2 g, 8.5 mol), acrylonitrile (53.1 g, 1.0 mol), 2-acrylamido-2-methylpropanesulfonic acid (103.6 g, 0.5 mol), potassium persulfate (1.35 g, 0.005 mol) were used. A mole ratio of acrylamide, acrylonitrile, and 2-acrylamido-2-methylpropanesulfonic acid was 85:10:5. About 10 mL of the reaction solution (reaction product) was taken to measure the non-volatile component, and the result was 9.5% (theoretical value: 10%).

Synthesis Example 6: AM/AN/AMPS=65/30/5,
Weight Average Molecular Weight: 673,000, Glass
Transition Temperature: 180° C.

An acrylic copolymer was prepared according to the same method as Synthesis Example 1 except that acrylamide (462.0 g, 6.5 mol), acrylonitrile (159.2 g, 3.0 mol), 2-acrylamido-2-methylpropanesulfonic acid (103.6 g, 0.5 mol), and potassium persulfate (1.35 g, 0.005 mol) were used. A mole ratio of acrylamide, acrylonitrile, and 2-acrylamido-2-methylpropanesulfonic acid was 65:30:5. About 10 mL of the reaction solution (reaction product) was taken to measure the non-volatile component, and the result was 9.5% (theoretical value: 10%).

Synthesis Example 7: AM/AN/AMPS=85/10/5,
Weight Average Molecular Weight: 270,000, Glass
Transition Temperature: 164° C.

An acrylic copolymer was prepared according to the same method as Synthesis Example 1 except that acrylamide (604.2 g, 8.5 mol), acrylonitrile (53.1 g, 1.0 mol) and 2-acrylamido-2-methylpropanesulfonic acid (103.6 g, 0.5 mol) were used, and the reaction was performed for 9 hours. A mole ratio of acrylamide, acrylonitrile, and 2-acrylamido-2-methylpropanesulfonic acid was 85:10:5. About 10 mL of the reaction solution (reaction product) was taken to measure the non-volatile component, and the result was 9.5% (theoretical value: 10%).

Comparative Synthesis Example 1:
AM/AN/AMPS=50/50/0, Weight Average
Molecular Weight: 420,000, Glass Transition
Temperature: 160° C.

An acrylic copolymer was prepared according to the same method as Synthesis Example 1 except that acrylamide (355.4 g, 5.0 mol) and acrylonitrile (265.3 g, 5.0 mol) were used, but the 2-acrylamido-2-methylpropanesulfonic acid was not used. A mole ratio of the acrylamide and the acrylonitrile was 50:50. About 10 mL of the reaction solution (reaction product) was taken to measure the non-volatile component, and the result was 9.5% (theoretical value: 10%).

Comparative Synthesis Example 2:
AM/AN/AMPS=0/50/50, Weight Average
Molecular Weight: 393,000, Glass Transition
Temperature: 173° C.

An acrylic copolymer was prepared according to the same method as Synthesis Example 1 except that acrylamide (355.4 g, 5.0 mol) and 2-acrylamido-2-methylpropanesulfonic acid (1036.2 g, 5.0 mol) were used, but the acrylonitrile was not used. A mole ratio of the acrylamide and the acrylamido-2-methylpropane sulfonic acid was in 50:50. About 10 mL of the reaction solution (reaction product) was taken to measure the non-volatile component, and the result was 9.5% (theoretical value: 10%).

Comparative Synthesis Example 3:
AM/AN/AMPS=85/10/5, Weight Average
Molecular Weight: 112,000, Glass Transition
Temperature: 158° C.

An acrylic copolymer was prepared according to the same method as Synthesis Example 1 except that the lithium hydroxide aqueous solution was not used, but the reaction time was changed into 6 hours. About 10 mL of the reaction solution (reaction product) was taken to measure the non-volatile component, and the result was 9.5% (theoretical value: 10%).

Comparative Synthesis Example 4:
AM/AN/AMPS=65/30/5, Weight Average
Molecular Weight: 183,000, Glass Transition
Temperature: 165° C.

An acrylic copolymer was prepared according to the same method as Synthesis Example 1 except that acrylamide (462.0 g, 6.5 mol), acrylonitrile (159.2 g, 3.0 mol), and 2-acrylamido-2-methylpropanesulfonic acid (103.6 g, 0.5 mol) were used, but the reaction time was changed into 6 hours. A mole ratio of acrylamide, acrylonitrile, and 2-acrylamido-2-methylpropanesulfonic acid was 65:30:5. About 10 mL of the reaction solution (reaction product) was taken to measure the non-volatile component, and the result was 9.5% (theoretical value: 10%).

Comparative Synthesis Example 5:
AM/AN/AMPS=85/10/5, Weight Average
Molecular Weight: 745,000, Glass Transition
Temperature: 172° C.

An acrylic copolymer was prepared according to the same method as Synthesis Example 1 except that acrylamide (604.2 g, 8.5 mol), acrylonitrile (53.1 g, 1.0 mol), and 2-acrylamido-2-methylpropanesulfonic acid (103.6 g, 0.5 mol), potassium persulfate (1.35 g, 0.005 mol) were used, but the reaction time was changed into 15 hours. A mole ratio of acrylamide, acrylonitrile, and 2-acrylamido-2-methylpropanesulfonic acid was 85:10:5. About 10 mL of the reaction solution (reaction product) was taken to measure the non-volatile component, and the result was 9.5% (theoretical value: 10%).

Comparative Synthesis Example 6:
AM/AN/AMPS=65/30/5, Weight Average
Molecular Weight: 770,000, Glass Transition
Temperature: 182° C.

An acrylic copolymer was prepared according to the same method as Synthesis Example 1 except that acrylamide (462.0 g, 6.5 mol), acrylonitrile (159.2 g, 3.0 mol), 2-acrylamido-2-methylpropanesulfonic acid (103.6 g, 0.5 mol), and potassium persulfate (1.35 g, 0.005 mol) were used, but the reaction time was changed into 15 hours. A mole ratio of acrylamide, acrylonitrile, and 2-acrylamido-2-methylpropanesulfonic acid was 65:30:5. About 10 mL of the reaction solution (reaction product) was taken to measure the non-volatile component, and the result was 9.5% (theoretical value: 10%).

Table 1 shows mole ratios, weight average molecular weights, and glass transition temperatures of each monomer of the acrylic copolymer prepared in Synthesis Examples 1 to 7 and Comparative Synthesis Examples 1 to 6.

TABLE 1

| | Monomer mole ratio (%) | | | Weight average molecular weight (g/mol) | Glass transition temperature (° C.) |
|---|---|---|---|---|---|
| | AM | AN | AMPS | | |
| Synthesis Example 1 | 85 | 10 | 5 | 410,000 | 165 |
| Synthesis Example 2 | 75 | 20 | 5 | 402,000 | 169 |
| Synthesis Example 3 | 65 | 30 | 5 | 404,000 | 174 |
| Synthesis Example 4 | 55 | 40 | 5 | 411,000 | 178 |
| Synthesis Example 5 | 85 | 10 | 5 | 612,000 | 170 |
| Synthesis Example 6 | 65 | 30 | 5 | 673,000 | 180 |
| Synthesis Example 7 | 85 | 10 | 5 | 270,000 | 164 |
| Comparative Synthesis Example 1 | 50 | 50 | — | 420,000 | 160 |
| Comparative Synthesis Example 2 | — | 50 | 50 | 393,000 | 173 |
| Comparative Synthesis Example 3 | 85 | 10 | 5 | 112,000 | 158 |
| Comparative Synthesis Example 4 | 65 | 30 | 5 | 183,000 | 165 |
| Comparative Synthesis Example 5 | 85 | 10 | 5 | 745,000 | 172 |
| Comparative Synthesis Example 6 | 65 | 30 | 5 | 770,000 | 182 |

In Table 1, AM is acrylamide, AN is acrylonitrile, and AMPS is 2-acrylamido-2-methylpropanesulfonic acid.

Examples: Manufacture of Separator for Secondary Battery

Example 1-1

The acrylic copolymer (10 wt % in distilled water) according to Synthesis Example 1, a dispersing agent, and boehmite (AOH60, Nabaltec AG, average particle diameter: 600 nm) are put in a water solvent in a weight ratio of 1:20, and then, milled therewith at 25° C. for 30 minutes with a bead mill, and water was added thereto until a total solid content became 20 wt % to prepare a composition for forming the coating layer. The composition was die-coated to be 3 μm thick to be on the single surface of a 12.5 μm-thick polyethylene porous substrate (air permeability: 113 sec/100 cc, puncture strength: 360 kgf, SK) and then, dried at 70° C. for 10 minutes to manufacture a separator for secondary battery.

Example 1-2

A separator for a secondary battery was manufactured according to the same method as Example 1-1 except that the acrylic copolymer according to Synthesis Example 1 and boehmite were used in a weight ratio of 1:40.

Example 1-3

A separator for secondary battery was manufactured according to the same method as Example 1-1 except that 25 wt % of inorganic dispersion was first prepared by adding boehmite (average particle diameter: 600 nm, AOH60 made by Nabaltec AG) and a polyacrylic dispersing agent corresponding to 1.0 wt % of the boehmite to a water solvent and then, milling the mixture at 25° C. for 30 minutes, and then the acrylic copolymer of Synthesis Example 1 was added to the inorganic dispersion to have a weight ratio of 1:20 between the acrylic copolymer and the boehmite, and water was added to have an entire solid of 20 wt %.

Example 2

A separator for a secondary battery was manufactured according to the same method as Example 1-1 except that the acrylic copolymer according to Synthesis Example 2 was used instead of the acrylic copolymer according to Synthesis Example 1.

Example 3

A separator for a secondary battery was manufactured according to the same method as Example 1-1 except that the acrylic copolymer according to Synthesis Example 3 was used instead of the acrylic copolymer according to Synthesis Example 1.

Example 4

A separator for a secondary battery was manufactured according to the same method as Example 1-1 except that the acrylic copolymer according to Synthesis Example 4 was used instead of the acrylic copolymer according to Synthesis Example 1.

Example 5

A separator for a secondary battery was manufactured according to the same method as Example 1-1 except that the acrylic copolymer according to Synthesis Example 5 was used instead of the acrylic copolymer according to Synthesis Example 1.

Example 6

A separator for a secondary battery was manufactured according to the same method as Example 1-1 except that the acrylic copolymer according to Synthesis Example 6 was used instead of the acrylic copolymer according to Synthesis Example 1.

Example 7

A separator for a secondary battery was manufactured according to the same method as Example 1-1 except that the acrylic copolymer according to Synthesis Example 7 was used instead of the acrylic copolymer according to Synthesis Example 1.

Comparative Example 1

A separator for a secondary battery was manufactured according to the same method as Example 1-1 except that the acrylic copolymer according to Comparative Synthesis Example 1 was used instead of the acrylic copolymer according to Synthesis Example 1.

Comparative Example 2

A separator for a secondary battery was manufactured according to the same method as Example 1-1 except that the acrylic copolymer according to Comparative Synthesis Example 2 was used instead of the acrylic copolymer according to Synthesis Example 1.

Comparative Example 3

A separator for a secondary battery was manufactured according to the same method as Example 1-1 except that the acrylic copolymer according to Comparative Synthesis Example 3 was used instead of the acrylic copolymer according to Synthesis Example 1.

Comparative Example 4

A separator for a secondary battery was manufactured according to the same method as Example 1-1 except that the acrylic copolymer according to Comparative Synthesis Example 4 was used instead of the acrylic copolymer according to Synthesis Example 1.

Comparative Example 5

A separator for a secondary battery was manufactured according to the same method as Example 1-1 except that the acrylic copolymer according to Comparative Synthesis Example 5 was used instead of the acrylic copolymer according to Synthesis Example 1.

Comparative Example 6

A separator for a secondary battery was manufactured according to the same method as Example 1-1 except that the acrylic copolymer according to Comparative Synthesis Example 6 was used instead of the acrylic copolymer according to Synthesis Example 1.

Table 2 shows a mole ratio of each monomer of the acrylic copolymers of the separators for a secondary battery of Examples 1-1 to 1-3, Examples 2 to 7, and Comparative Examples 1 to 6, and a content of each acrylic copolymer based on a total weight of a coating layer, and a weight ratio of each acrylic copolymer with inorganic particles.

TABLE 2

| | Mole ratio of each monomer in the acrylic copolymer | | | Amount of the acrylic copolymer based on the total amount of the coating layer (wt %) | Weight ratio of acrylic copolymer and inorganic particles |
|---|---|---|---|---|---|
| | AM | AN | AMPS | | |
| Example 1-1 | 85 | 10 | 5 | 4.76 | 1:20 |
| Example 1-2 | 85 | 10 | 5 | 2.43 | 1:40 |
| Example 1-3 | 85 | 10 | 5 | 4.76 | 1:20 |
| Example 2 | 75 | 20 | 5 | 4.76 | 1:20 |
| Example 3 | 65 | 30 | 5 | 4.76 | 1:20 |
| Example 4 | 55 | 40 | 5 | 4.76 | 1:20 |
| Example 5 | 85 | 10 | 5 | 4.76 | 1:20 |
| Example 6 | 65 | 30 | 5 | 4.76 | 1:20 |
| Example 7 | 85 | 10 | 5 | 4.76 | 1:20 |
| Comparative Example 1 | 50 | 50 | — | 4.76 | 1:20 |
| Comparative Example 2 | 50 | — | 50 | 4.76 | 1:20 |
| Comparative Example 3 | 10 | 85 | 5 | 4.76 | 1:20 |
| Comparative Example 4 | 65 | 30 | 5 | 4.76 | 1:20 |
| Comparative Example 5 | 85 | 10 | 5 | 4.76 | 1:20 |
| Comparative Example 6 | 65 | 30 | 5 | 4.76 | 1:20 |

EVALUATION EXAMPLES

Evaluation Example 1: Evaluation of Air Permeability

Each time (seconds) until the separators for a lithium secondary battery according to Examples 1-1 to 1-3, Examples 2 to 7 and Comparative Examples 1 to 6 passed 100 cc of air was measured by using a permeability measuring device (Asahi Seiko Co., Ltd., EG01-55-1MR), and the results are shown in Table 3.

Evaluation Example 2: Evaluation of Heat Shrinkage Rate

The separators for a lithium secondary battery according to Examples 1-1 to 1-3, Examples 2 to 7, and Comparative Examples 1 to 6 were respectively cut into a size of 8 cm×8 cm to prepare samples. The samples after drawing a 5 cm×5 cm-size quadrangle on the surface were inserted between paper or alumina powder, allowed to stand at 150° C. in an oven for 1 hour, and taken out of the oven, and each shrinkage rate between machine direction (MD) and in a traverse direction (TD) was calculated by measuring sides of the quadrangles drawn on the samples. The results are shown in Table 3.

Evaluation Example 3: Evaluation of Heat-Resistant Facture

The separators for a lithium secondary battery according to Examples 1-1 to 1-3, Examples 2 to 7, and Comparative Examples 1 to 6 were respectively cut into a size of 5 cm×5 cm to obtain samples. The samples were respectively attached on a cardboard having a 4 cm×4 cm-sized hole by using a polyimide film and put in each oven heated up to 200° C., 230° C., and 250° C. The samples were taken out of the ovens after 10 minutes to examine whether or not the samples were fractured. When fractured, O was given, but when not fractured, X was given. The results are shown in Table 3.

TABLE 3

| | Air permeability of separator (sec/100 cc) | Thermal shrinkage of separator (%) | | Heat-resistant facture | | |
|---|---|---|---|---|---|---|
| | | MD | TD | 200° C. | 230° C. | 250° C. |
| Example 1-1 | 145 | 5 | 3 | X | X | X |
| Example 1-2 | 133 | 3 | 2 | X | X | O |
| Example 1-3 | 135 | 2 | 2 | X | X | X |
| Example 2 | 133 | 3 | 2 | X | X | O |
| Example 3 | 135 | 2 | 2 | X | X | X |
| Example 4 | 146 | 4 | 3 | X | X | X |
| Example 5 | 140 | 3 | 2 | X | X | X |
| Example 6 | 136 | 3 | 3 | X | X | X |
| Example 7 | 138 | 3 | 1 | X | X | X |
| Comparative Example 1 | 141 | 8 | 7 | X | O | O |
| Comparative Example 2 | 158 | 15 | 13 | O | O | O |
| Comparative Example 3 | 171 | 25 | 22 | O | O | O |
| Comparative Example 4 | 172 | 25 | 22 | O | O | O |
| Comparative Example 5 | cannot be manufactured | — | — | — | — | — |
| Comparative Example 6 | cannot be manufactured | — | — | — | — | — |

Referring to Table 3, the separators manufactured in Examples 1-1 to 1-3 and Examples 2 to 7 exhibited excellent air permeability, improved heat-resistant facture resistance, and exhibited shrinkage rates of less than 5% at 150° C. Accordingly, heat resistance and adhesion properties may be implemented.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

100: lithium secondary battery
112: negative electrode
113: separator
114: positive electrode
120: battery case
140: sealing member

The invention claimed is:

1. A separator for a lithium secondary battery, comprising a porous substrate; and
a coating layer on at least one surface of the porous substrate,
wherein the coating layer comprises an (meth)acrylic copolymer including a first structural unit, a second structural unit, and a third structural unit,
the first structural unit is derived from (meth)acrylamide,
the second structural unit is derived from (meth)acrylonitrile, and
the third structural unit is derived from (meth)acrylamido sulfonic acid, (meth)acrylamido sulfonic acid salt, or a combination thereof,
the first structural unit is included in an amount of 80 mol% to 90 mol% based on 100 mol% of the (meth)acrylic copolymer, the second structural unit is included in an amount of 5 mol% to 15 mol% based on 100 mol% of the (meth)acrylic copolymer, and third structural unit is included in 5 mol% to 10 mol% based on 100 mol% of the (meth)acrylic copolymer, and
the (meth)acrylic copolymer has a weight average molecular weight of 200,000 to 700,000.

2. The separator of claim 1, wherein
the first structural unit derived from (meth)acrylamide is included in an amount of 80 mol% to 85 mol% based on 100 mol% of the (meth)acrylic copolymer,
the second structural unit derived from (meth)acrylonitrile is included in an amount of 10 to 15 mol% based on 100 mol% of the (meth)acrylic copolymer, and
the third structural unit derived from (meth)acrylamido sulfonic acid, (meth)acrylamido sulfonic acid salt, or a combination thereof is included in an amount of 5 to 10 mol% based on 100 mol% of the (meth)acrylic copolymer.

3. The separator of claim 1, wherein
the first structural unit derived from (meth)acrylamide is represented by Chemical Formula 1,
the second structural unit derived from (meth)acrylonitrile is represented by Chemical Formula 2, and
the third structural unit derived from (meth)acrylamido sulfonic acid, (meth)acrylamido sulfonic acid salt, or a combination thereof is represented by one of Chemical Formula 3, Chemical Formula 4, Chemical Formula 5, and a combination thereof:

[Chemical Formula 1]

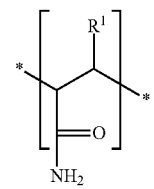

-continued

[Chemical Formula 2]

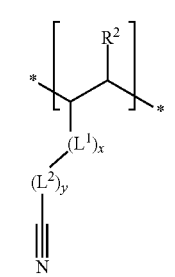

[Chemical Formula 3]

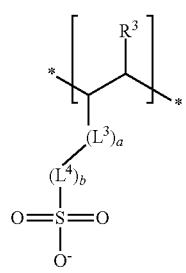

[Chemical Formula 4]

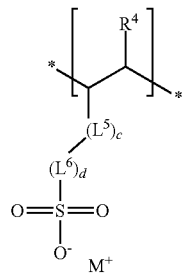

[Chemical Formula 5]

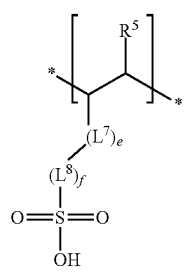

wherein, in Chemical Formula 1 to Chemical Formula 5, $R^1$ is hydrogen or a methyl group, $R^2$, $R^3$, $R^4$, and $R^5$ are each independently hydrogen or a C1 to C3 alkyl group, $L^1$, $L^3$, $L^5$, and $L^7$ are each independently —C(=O)—, —C(=O)O—, —OC(=O)—, —O—, or —C(=O)NH—, $L^2$, $L^4$, $L^6$, and $L^8$ are each independently a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, x and y are each independently an integer of 0 to 2, a, b, c, d, e, and f are each independently an integer of 0 to 2, and $M^+$ is an alkali metal.

4. The separator of claim 1, wherein the (meth)acrylic copolymer has a glass transition temperature of 150° C. to 180° C.

5. The separator of claim 1, wherein the (meth)acrylic copolymer is included in an amount of 1 to 5 wt% based on a total amount of the coating layer.

6. The separator of claim 1, wherein the coating layer further comprises inorganic particles.

7. The separator of claim 6, wherein the (meth)acrylic copolymer: inorganic particles are included in a weight ratio of 1:20 to 1:40.

8. The separator of claim 6, wherein the inorganic particles comprise $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite, or a combination thereof.

9. The separator of claim 1, wherein the coating layer has a thickness of 1 to 5 μm.

10. A lithium secondary battery, comprising a positive electrode, a negative electrode, and the separator of claim 1 between the positive electrode and the negative electrode.

* * * * *